United States Patent
Ahn

(10) Patent No.: US 8,899,206 B2
(45) Date of Patent: Dec. 2, 2014

(54) BALANCING DEVICE FOR ENGINE

(75) Inventor: Younghun Ahn, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/556,906

(22) Filed: Jul. 24, 2012

(65) Prior Publication Data

US 2013/0139778 A1     Jun. 6, 2013

(30) Foreign Application Priority Data

Dec. 1, 2011   (KR) .......................... 10-2011-0127962

(51) Int. Cl.
    *F02B 75/06*      (2006.01)

(52) U.S. Cl.
    USPC .................. 123/193.2; 123/52.5; 123/65 R; 464/180; 74/640

(58) Field of Classification Search
    USPC .............. 123/192.2, 191.1, 52.5, 65 R; 29/888.011; 464/180; 74/640
    See application file for complete search history.

(56) References Cited

U.S. PATENT DOCUMENTS

| | | | |
|---|---|---|---|
| 3,402,707 A * | 9/1968 | Heron | 123/192.2 |
| 6,655,339 B1 * | 12/2003 | Orr | 123/192.1 |
| 7,629,713 B2 * | 12/2009 | Beaulieu | 310/323.01 |
| 8,201,523 B2 * | 6/2012 | Cohen | 123/2 |
| 2002/0088424 A1 * | 7/2002 | Sayama et al. | 123/192.2 |
| 2010/0288214 A1 * | 11/2010 | Pelmear | 123/41.86 |
| 2011/0221208 A1 * | 9/2011 | Hyde et al. | 290/1 R |
| 2011/0303177 A1 * | 12/2011 | Hashimoto | 123/179.16 |

FOREIGN PATENT DOCUMENTS

| | | |
|---|---|---|
| JP | 49-4043 | 1/1974 |
| JP | 3271446 B2 | 1/2002 |
| JP | 2002-515962 A | 5/2002 |
| JP | 2008-202726 A | 9/2008 |
| KR | 10-0992401 B1 | 11/2010 |

\* cited by examiner

*Primary Examiner* — Noah Kamen
*Assistant Examiner* — Long T Tran
(74) *Attorney, Agent, or Firm* — Morgan, Lewis & Bockius LLP

(57) ABSTRACT

A balancing device for an engine includes a crankshaft for converting reciprocal motion of a piston of the engine to a rotary motion, at least one electromagnetic force generator mounted apart from the crankshaft by a predetermined distance and generating an electromagnetic force, and a control portion controlling the electromagnetic force generator to generate an electromagnetic force offsetting an unbalanced force occurring according to a rotational position of the crankshaft.

4 Claims, 5 Drawing Sheets

BALANCING DEVICE FOR ENGINE

CROSS-REFERENCE TO RELATED APPLICATION

The present application claims priority of Korean Patent Application Number 10-2011-0127962 filed Dec. 1, 2011, the entire contents of which application is incorporated herein for all purposes by this reference.

BACKGROUND OF INVENTION

1. Field of Invention

The present invention relates to a balancing device for engine. More particularly, the present invention relates to a balancing device for engine having advantage of saving space and components of engine, and reducing weight of engine by substituting a balance shaft applied to a conventional engine.

2. Description of Related Art

Generally an engine of vehicle is structurally unbalanced in the crank and the piston of the engine so that an engine balancing device is required.

FIG. 1 is a schematic diagram of various embodiments of a conventional engine balancing device, FIG. 2 is schematic diagram showing a movement of the conventional engine balancing device.

As shown in FIG. 1 or 2 the conventional engine balancing device has a balance shaft 2 for balancing the engine, the balance shaft adjusts the balancing by rotating in opposite direction of a crank shaft 2 with a 1:1 velocity ratio.

Therefore, the conventional art requires a lot of components such as the balancing shaft 3 having considerable length, a case 4 for inserting the balancing shaft 3, a balancing shaft driving gear for driving the balancing shaft 3 by connecting to the crank shaft 2, a balancing shaft bearing 6, etc.

As a result, the conventional art has a problem of increasing weight and size of the engine by the components such as balancing shaft 3, and other components 4 to 6, and increasing trouble in the engine.

Further, noise vibration harshness (NVH) of the engine becomes worse by noise and vibration produced by friction between the balancing shaft driving gear 5 and the crank shaft 2.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a balancing device for engine having advantages of reducing weight and size of the engine by simplifying balancing components, and reducing noise and vibration.

Various embodiments of the present invention provides a balancing device for an engine which includes: a crankshaft for converting a reciprocal motion of a piston of the engine to a rotary motion; at least one electromagnetic force generator mounted apart from the crankshaft by a predetermined distance and generating an electromagnetic force; and a control portion controlling the electromagnetic force generator to generate an electromagnetic force offsetting an unbalanced force occurring according to a rotational position of the crankshaft.

The engine may be two-cylinder engine.

The electromagnetic force generators may be formed at both sides of the crankshaft with respect to a rotating axis of the crankshaft, respectively.

The electromagnetic force generator may be mounted at an interior circumference of a crank case.

The balancing device may further include a position sensor detecting a position of the crankshaft and transmitting the position of the crankshaft to the control portion.

The electromagnetic force generator may have a solenoid generating an electromagnetic force, a control unit for controlling the solenoid, and a connector connecting the control unit and the control portion.

A balancing device for engine according to the present invention may simplify the engine and save a space by providing an electromagnetic force generator in crank case instead of balancing shaft.

Further the present invention may decrease noise and vibration since the electromagnetic force generator of the present invention may balance the engine apart from the crank case.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
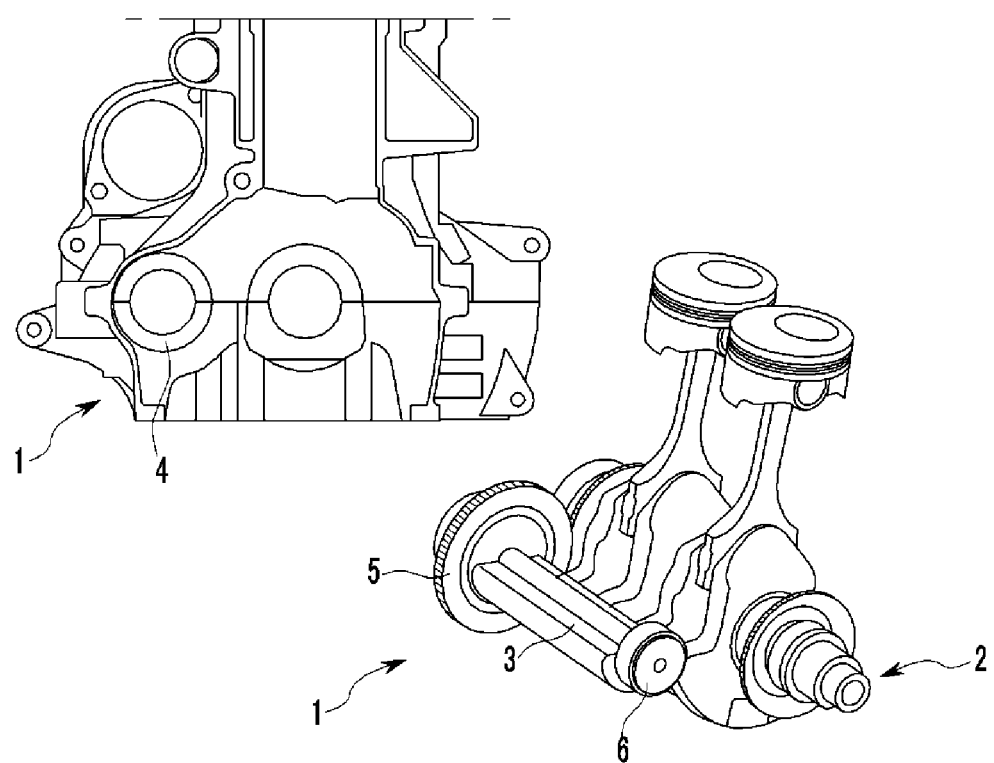
FIG. 1 is a schematic diagram of a conventional engine balancing device.
Figure 2:
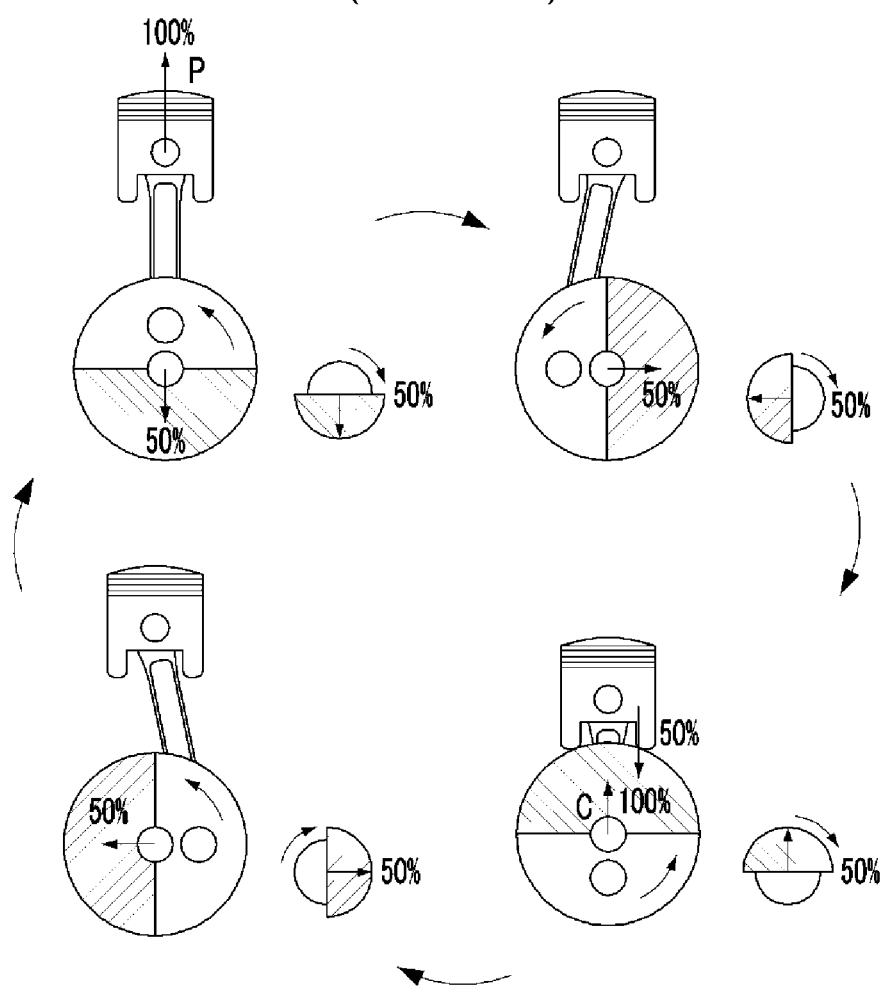
FIG. 2 is schematic diagram showing a movement of the conventional engine balancing device.
Figure 3:
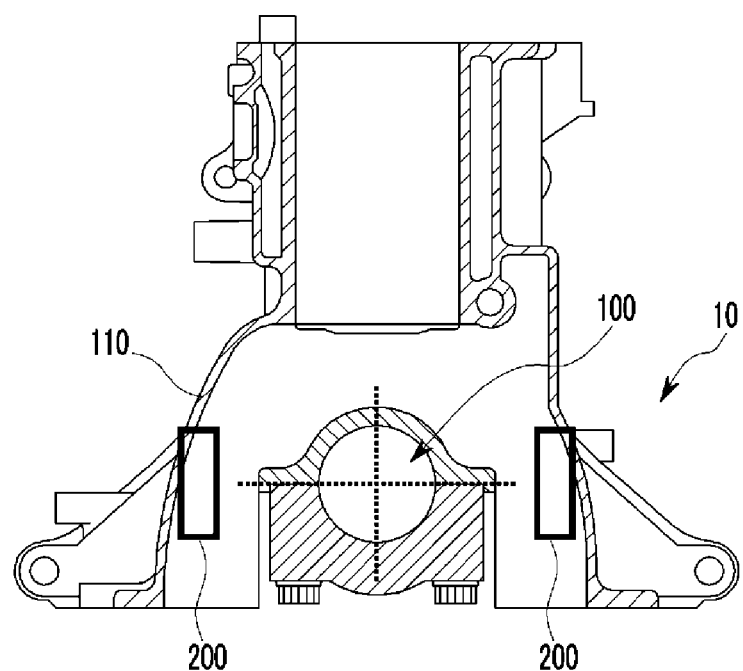
FIG. 3 is a cross-sectional view of an exemplary balancing device for engine according to the present invention.
Figure 4:
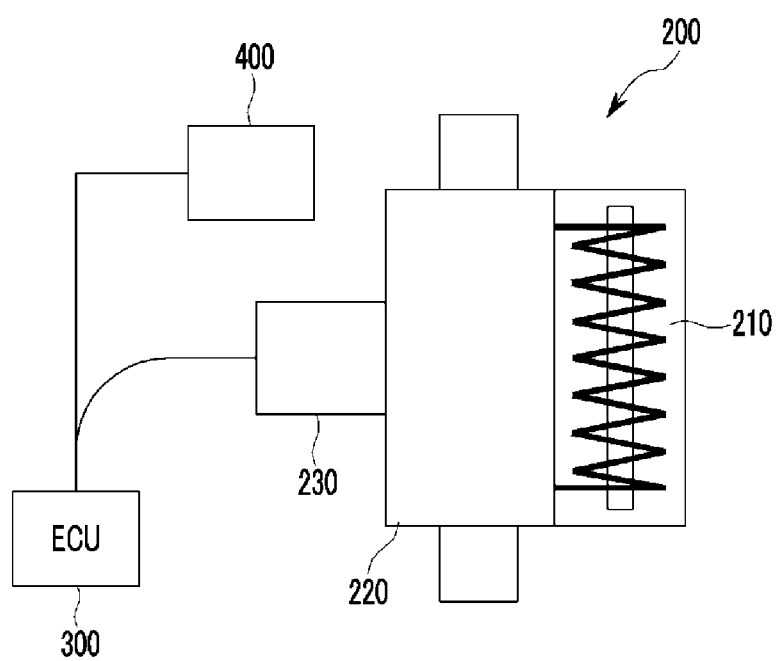
FIG. 4 is a schematic diagram of an exemplary balancing device for engine according to the present invention.

FIG. 3 is a cross-sectional view of a balancing device 10 for engine according to various embodiments of the present invention, and FIG. 4 is a schematic diagram of a balancing device 10 for engine according to various embodiments of the present invention.

As shown in FIG. 3 to FIG. 4, a balancing device 10 for engine according to various embodiments of the present invention may include a crankshaft 100 for converting a reciprocal motion of a piston of the engine to a rotary motion, at least one electromagnetic force generator 200 mounted apart from the crankshaft 100 by a predetermined distance and generating an electromagnetic force, and a control portion 300 controlling the electromagnetic force generator 200 to generate an electromagnetic force offsetting an unbalanced force occurring according to a rotational position of the crankshaft 100.

The crankshaft 100 is connected to a piston of the engine through a connecting road, and plays a role in changing a reciprocal motion of the piston into a rotational motion. In various embodiments the engine of the present invention may be a two cylinder engine, and the crankshaft 100 is connected to each piston of the two cylinder engine by a connecting rod.

As shown in FIG. 3, the electromagnetic force generators 200 may be formed at both sides of the crankshaft 100 with respect to a rotating axis of the crankshaft 100 respectively, and pulls the crankshaft 100 by generating electromagnetic force.

In various embodiments, the electromagnetic force generator 200 may include a solenoid 210 generating an electromagnetic force, a control unit 220 for controlling the solenoid 210, and a connector 230 connecting the control unit 220 and the control portion 300.

The control portion 300 transmits a control command to the control unit 220 on an electrical signal, and the control unit 220 controls the solenoid 210 to generate an electromagnetic force corresponding to the control command.

As shown in FIG. 4, the solenoid 210 is generally made by winding a coil evenly, densely, and cylindrically, and is used as an energy conversion device and electro magnet. If currents are flowing through the solenoid 210, a magnetic field will formed, and a steel material such as the crankshaft 100 will be pulled along to the solenoid 210 by the magnetic field.

In various embodiments, as shown in FIG. 3, the electromagnetic force generator 200 may be mounted at an interior circumference of crank case 110 of the engine cylinder block. There is no need to have an extra space for the electromagnetic force generator 200 since the electromagnetic force generator 200 is mounted in the crank case 110, as a result a size of the engine may be reduced.

However, the electromagnetic force generator 200 is not limited as above mentioned compositions, and any device generating an electromagnetic force may be used as the electromagnetic force generator 200.

The control portion 300 controls the electromagnetic force generator 200 to generate an electromagnetic force offsetting an unbalanced force occurring according to a rotational position of the crankshaft 100.

In various embodiments the control portion 300 may be an electric control unit (ECU) of a vehicle.

Information of the rotational position of the crankshaft 100 has to be transmitted to the control portion 300 in advance so as to generate an electromagnetic force offsetting an unbalanced force occurring according to the rotational position of the crankshaft 100.

To achieve this, the present invention may further include a position sensor 400 for detecting a position of the crankshaft 100

Information of rotational position of the crankshaft 100 is transmitted to the control portion 300 in a real time, and the control portion 300 calculates an unbalanced force according to the information and controls the electromagnetic force generator 200 to generate an electromagnetic force offsetting the calculated unbalanced force.

Figure 5:
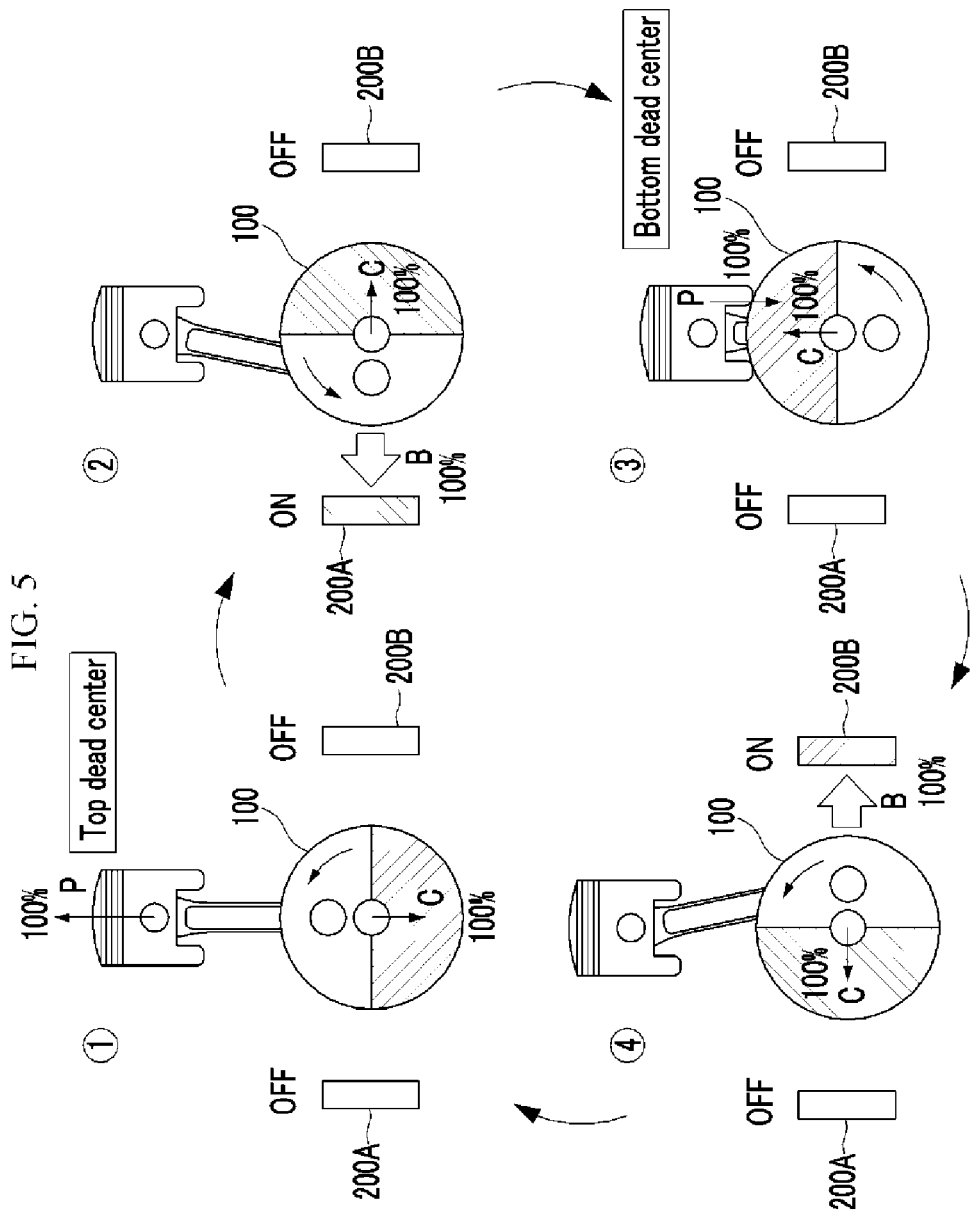
FIG. 5 is schematic diagram showing a movement of an exemplary balancing device for engine according to the present invention.

FIG. 5 is schematic diagram showing a movement of balancing device 10 for engine according to various embodiments of the present invention. As shown in FIG. 5, the electromagnetic force generators 200A and 200B are formed at both sides of the crankshaft 100 with respect to a rotating axis of the crankshaft 100 respectively, and the electromagnetic force generators 200A and 200B are connected to the control portion 300 respectively In the case of number 1, as shown in FIG. 5, the piston of the engine reaches top dead center, and a rotational position of the crankshaft 100 at this moment is measured by the position sensor 400 in a real time and is transmitted to the control portion 300. The rotational position of the crankshaft 100 in the case of number 1 is defined as a 0 degree angle. In this case, the lower portion of crankshaft 100 is heavier than the upper portion of the crankshaft shown in FIG. 5, as a result the unbalance force (C) is applied in a downward direction. Therefore, the force (P) produced by the movement of the piston applied in upward direction and the unbalance force (C) applied in downward direction offset each other. The control portion turns off both electromagnetic force generators 200A and 200B not to generate electromagnetic force in this state since the engine is balanced in the case of number 1, as shown in FIG. 5.

In the case of number 2, as shown in FIG. 5, the crankshaft rotates 90 degree counterclockwise from the position of the number 1 case according to the piston which is moving from top dead center to bottom dead center. By the standard of FIG. 5, unbalanced force (C) is produced to the right side of the center of the rotation by the rotation of the crankshaft 100. In this moment, the position of the crankshaft 100 is measured by the position sensor 400 and is transmitted to the control portion 300 in a real time. The control portion 300 receives the position of the crankshaft 100 in the case of number 2, and turns on the left electromagnetic force generator 200A to generate an electromagnetic force (B) as shown in FIG. 5. The crankshaft 100 is pulled to left by the electromagnetic force (B) which is produced by the electromagnetic force generator. The control portion 300 controls the size of the electromagnetic force (B) to be equal to the unbalanced force (C) produced to the right of the crankshaft 100 so that the electromagnetic force (B) and the unbalanced force (C) offset each other.

In the case of number 3, as shown in FIG. 5, the piston reaches to bottom dead center, and the crankshaft rotates 180 degree counterclockwise from the position of the number 1 case according to the movement of the piston The case of number 3 is contrary to the case of number 1, therefore the force (P) produced by the movement of the piston applied in downward direction and the unbalance force (C) applied in upward direction offset each other. As a result, the control portion 300 turns off both electromagnetic force generators 200A and 200B placed left and right of the crankshaft 100 not to generate electromagnetic force in this state since the engine is balanced in the case of number 3.

In the case of number 4, as shown in FIG. 5, the crankshaft 100 rotates 270 degree counterclockwise from the position of the number 1 case according to the piston which is moving from bottom dead center to top dead center. The case of number 3 is contrary to the case of number 1, by the standard of FIG. 5, unbalanced force (C) is produced to the left side of the center of rotation by the rotation of the crankshaft 100. In this moment, the position of the crankshaft 100 is measured by the position sensor 400 and is transmitted to the control portion 300 in a real time. The control portion 300 receives the position of the crankshaft 100 in the case of number 3, and turns on the right electromagnetic force generator 200B to generate an electromagnetic force (B) as shown in FIG. 5. The crankshaft 100 is pulled to right by the electromagnetic force (B) which is produced by the electromagnetic force generator. The control portion 300 controls the size of the electromagnetic force (B) to be equal to the unbalanced force (C) produced to the left of the crankshaft 100 so that the electromagnetic force (B) and the unbalanced force (C) offset each other.

According to various embodiments of the present invention the control portion 300 receives the position of the crankshaft 100 in a real time from the position sensor 400, and controls the electromagnetic force generator 200 to produce an electromagnetic force which has an equal size and opposite direction to the unbalanced force so as to offset each other Therefore, the present invention maintains balance of the engine by offsetting unbalanced force using simple compositions without balancing shaft used in the conventional art.

Further, the balancing device for engine according to the present invention may decrease noise and vibration by disposing the balancing device apart from the crankshaft and balancing the engine using electromagnetic force.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A balancing device for an engine, comprising:
   a crankshaft for converting reciprocal motion of a piston of the engine to rotary motion;
   at least one electromagnetic force generator mounted and aligned on an imaginary horizontal line passing a rotation axis of the crankshaft at both left and right sides of the crankshaft with respect to the rotation axis of the crankshaft and generating an electromagnetic force;
   a control portion controlling the electromagnetic force generator that is mounted at an interior circumference of a crank case of an engine cylinder block to generate an electromagnetic force offsetting an unbalanced force occurring according to a rotational position of the crankshaft by directly engaging the crankshaft via the electromagnetic force of the electromagnetic force generator; and
   a position sensor detecting the rotational position of the crankshaft and transmitting the rotational position of the crankshaft to the control portion;
   wherein the electromagnetic force generator has a solenoid.

2. The balancing device of claim 1, wherein the engine is two-cylinder engine.

3. The balancing device of claim 2, wherein a plurality of electromagnetic force generators are formed at opposing sides of the crankshaft with respect to the rotating axis of the crankshaft, respectively.

4. The balancing device of claim 1, wherein the electromagnetic force generator has a control unit for controlling the solenoid, and a connector connecting the control unit and the control portion.

* * * * *